(12) United States Patent
Worrall et al.

(10) Patent No.: US 8,949,946 B2
(45) Date of Patent: Feb. 3, 2015

(54) METHODS AND SYSTEMS FOR CONTENT AVAILABILITY BASED ON LOCATION

(71) Applicant: Global Graphics Software Limited, Cambridge (GB)

(72) Inventors: Eric Worrall, March (GB); Diane Tyler Collins, Cambourne (GB)

(73) Assignee: Global Graphics Software Limited, Cambourne, Cambridge (GB)

( * ) Notice: Subject to any disclaimer, the term of this patent is extended or adjusted under 35 U.S.C. 154(b) by 46 days.

(21) Appl. No.: 13/777,290

(22) Filed: Feb. 26, 2013

(65) Prior Publication Data

US 2014/0245393 A1 Aug. 28, 2014

(51) Int. Cl.
*G06F 15/16* (2006.01)
*H04L 29/06* (2006.01)

(52) U.S. Cl.
CPC .................................. *H04L 63/107* (2013.01)
USPC ............ 726/4; 726/1; 726/2; 726/3; 709/223; 709/224; 709/225

(58) Field of Classification Search
CPC ..... H04L 63/20; H04L 63/0281; H04L 63/08; H04L 63/10; H04L 63/306; H04L 9/28; G06F 17/30165; G06F 21/10; G06F 8/30; H04W 12/00; H04W 12/06; H04W 12/08; H04W 4/02

USPC .................................. 726/1–4; 709/223–225
See application file for complete search history.

(56) References Cited

U.S. PATENT DOCUMENTS

| 8,638,989 B2 * | 1/2014 | Holz .............................. 382/103 |
| 2002/0125886 A1 | 9/2002 | Bates et al. |
| 2008/0004039 A1 | 1/2008 | Ober et al. |
| 2014/0007183 A1 * | 1/2014 | Qureshi et al. .................... 726/1 |

FOREIGN PATENT DOCUMENTS

| WO | 2005069179 A1 | 7/2005 |
| WO | 2010058061 A1 | 5/2010 |

* cited by examiner

*Primary Examiner* — Thanhnga B Truong
(74) *Attorney, Agent, or Firm* — Lowe Graham Jones PLLC; Bruce E. Black

(57) ABSTRACT

Access to protected content is based on a client device being within a region. The region may be a mobile or movable region, and/or a region that is in motion. In some embodiments, the region may be determined based on a distance from a position within the region, or based on a boundary about the position that need not be symmetrical. In some embodiments, the region is a three dimensional region. In some embodiments, being within the region is further based on the region being above a defined altitude. In further embodiments, a determination for access is based on whether the client device is detected to be in motion relative to the region.

17 Claims, 6 Drawing Sheets

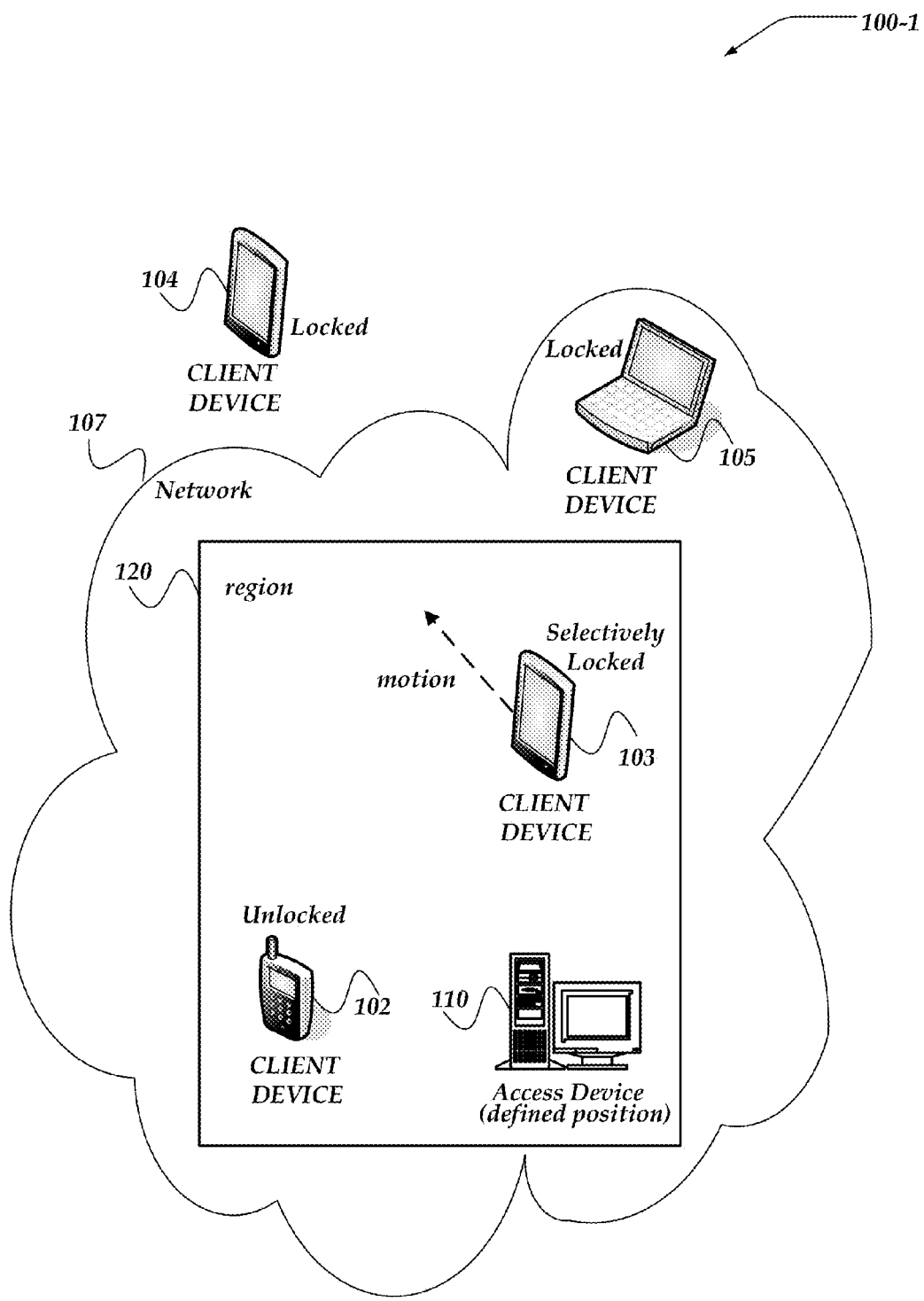
FIG. 1-A

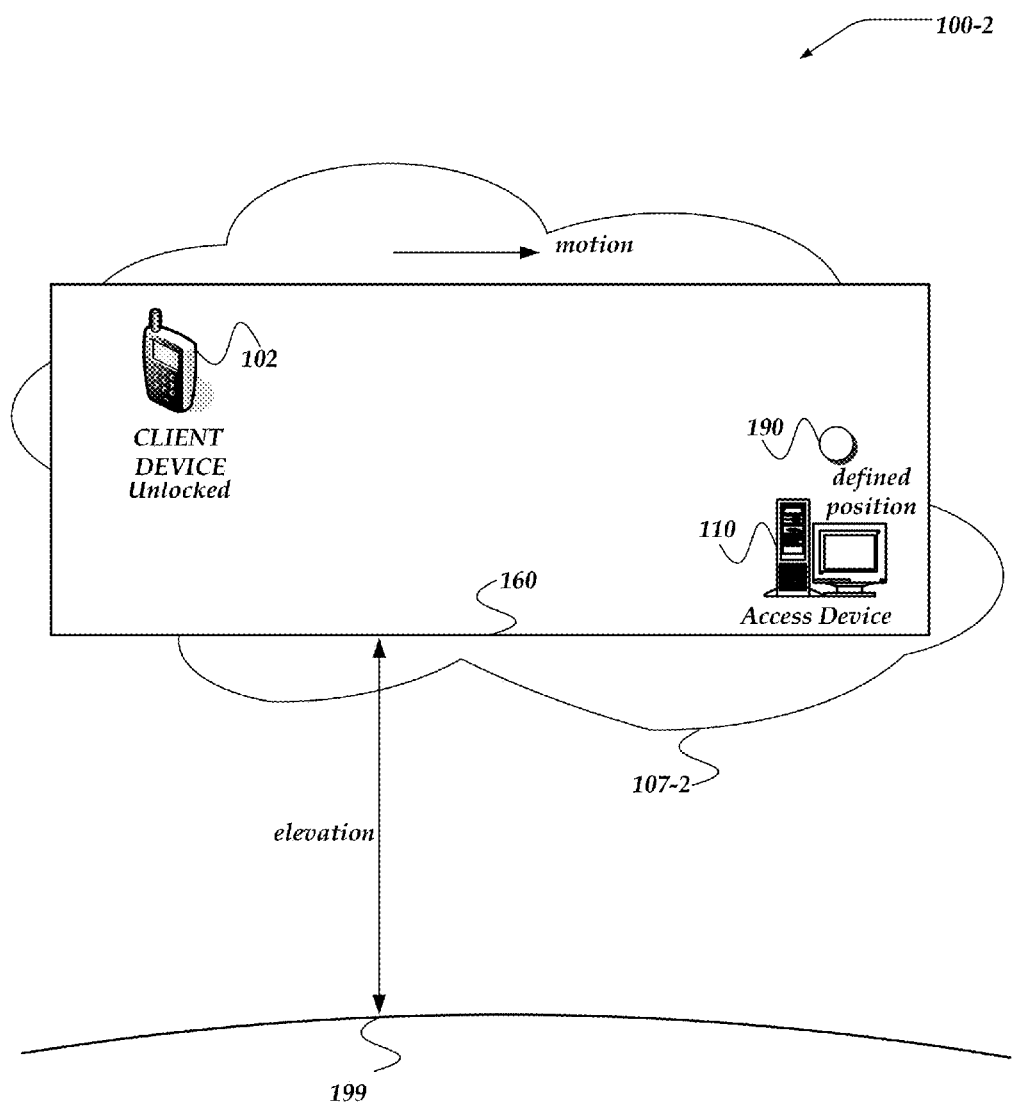
FIG. 1-B

METHODS AND SYSTEMS FOR CONTENT AVAILABILITY BASED ON LOCATION

TECHNICAL FIELD

The present embodiments relate generally to protected content and, more particularly, but not exclusively, to managing access to content based on a location of the content (and/or client device having the content) with respect to a defined region, and further selectively based on the region being mobile, movable, or in motion.

BACKGROUND

In today's society, people have become increasingly mobile. In response, today's computing devices have also become more mobile, providing users with a greater opportunity to access content virtually anywhere and/or anytime. However, while there is a desire by many to have increased access to content, content providers may, for a variety of reasons, prefer to restrict access. Such restrictions may be for security reasons, costs reasons, as well as other reasons. Therefore, there is a desire to be able to balance the desire for increased access while maintaining selected restrictions to the content. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which:

FIG. 1-A illustrates a system diagram of one embodiment of an environment in which the subject innovations may be practiced;

FIG. 1-B illustrates a system diagram of another embodiment of an environment in which the subject innovations may be practiced;

DETAILED DESCRIPTION

Figure 2:
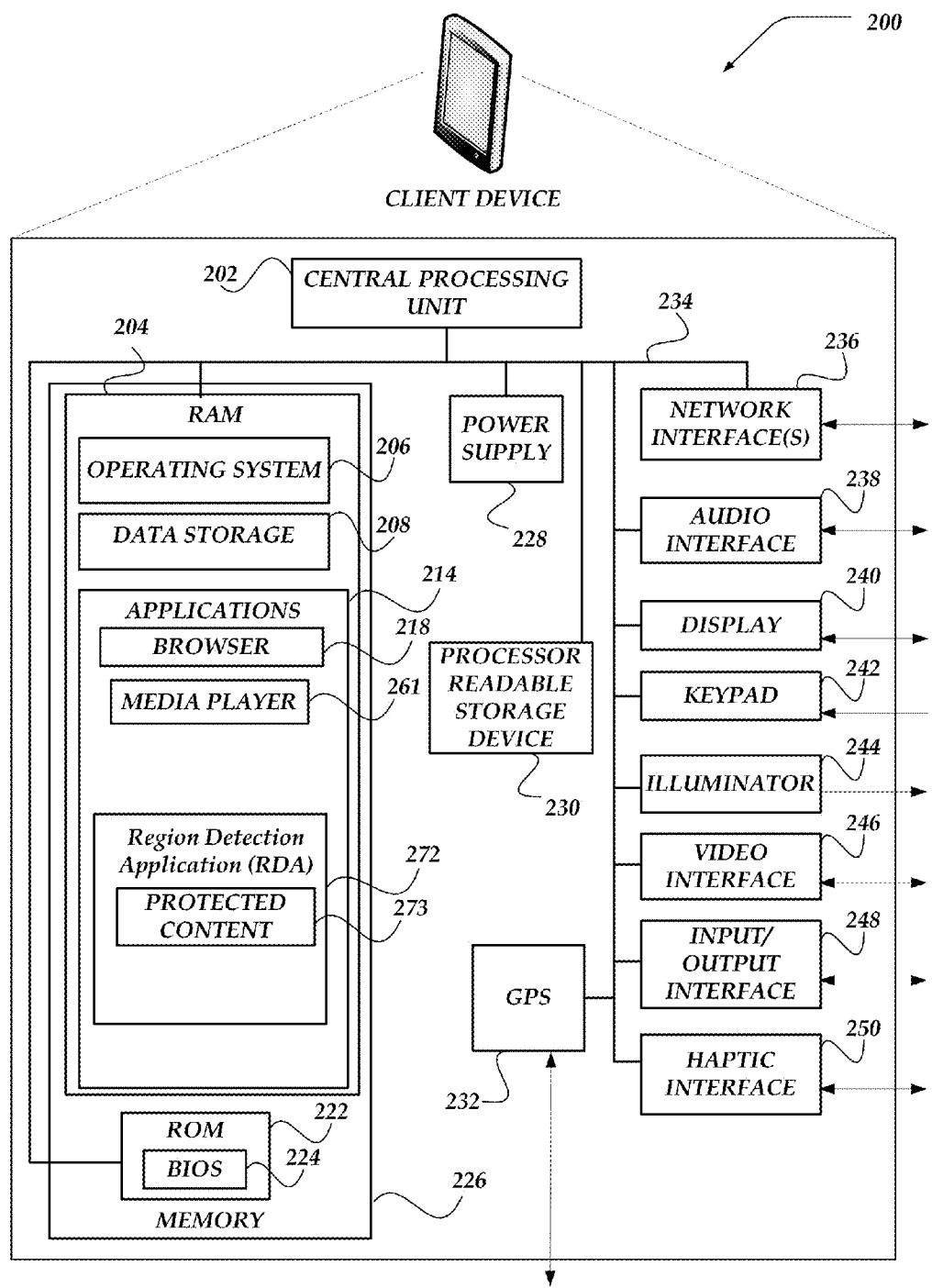
FIG. 2 illustrates one possible embodiment of a client device usable within the environment of FIGS. 1A and 1B.

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" includes any digital data that may be communicated over a network, or otherwise provided to a client device. Non-exhaustive examples of content include but are not limited to movies, videos, music, spoken word, pictures, illustrations, graphics, images, text, e-books, spreadsheets, and the like. Content may also include an application, such as a game, a script, or the like. In one embodiment, the content may be protected through a license that describes how, where, when, by whom, or so forth, content that is protected may be accessed, distributed, copied, or the like. For example, the content can be protected from being accessible or otherwise playable when the content is determined to be outside of a defined three-dimensional region and selectively when detected to be in motion relative to a defined position. In one embodiment, the content is protected using encryption.

As used herein, encryption refers to the process of transforming digital content (referred to as plaintext) using an algorithm (called a cipher) to make it unreadable to anyone except those possessing special knowledge, usually referred to as a key. Decryption is the process of converting encrypted digital content back into its original form. As used herein, "unencrypted" digital content refers to digital content received in plaintext—or that is otherwise not encrypted, and therefore does not need to be decrypted. Unencrypted content as used herein then is also referred to as unlocked content. Encrypted content then is locked content that is not accessible for play or other access.

Encryption can use symmetric key encryption, or asymmetric key encryption, or even a combination of symmetric and asymmetric key encryption. Asymmetric key encryption is sometimes known as public/private key encryption. In some embodiments, the private key is uniquely associated with a user, content, application, or other component, such that attempts to access the private key improperly could result in disabling subsequent access to the private key.

It should be understood plaintext digital content, may be received, in at least one embodiment, in a compressed form, or encoded form, and still be considered as plaintext for the purposes described herein. Moreover, as discussed further below, digital content may include portions that are encrypted, and other portions that are unencrypted within a same stream or larger context of digital content. Further, different encrypted portions of the digital content may be encrypted using different encryption keys, and/or employ different licenses. In one embodiment, keys useable for decrypting the differently encrypted digital content may be rotated, reused, or renegotiated.

The following briefly provides a simplified summary of the subject innovations in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, subject innovations are directed towards managing access to content based on a location of the content with respect to a defined region and may further include selectively determining access based on whether the content is detected to be in motion relative to a defined position. Thus, the content may be locked unless it is determined to be within one or more defined regions. Within a defined range or region, the content may be unlocked such that a user may access and/or otherwise interact with the content. When the content is moved outside of the defined region, the content is forced closed and locked. In some embodiments, use of the content might be automatically terminated, if currently being accessed, and subsequently locked. To open or unlock and access the content again, would then involve at least moving the content back within the region.

In some embodiments, the region is defined as being within a determinable distance from a defined position. However, the region or regions need not be symmetric, and may include irregularly shaped regions about the defined position as well. The regions may be defined in one-dimension (e.g., a distance from a particular point) or in two-dimensions (e.g., with a two-dimensional boundary) or in three-dimensions (e.g., with a three-dimensional boundary). In some embodiments, the region includes an elevation as measured from a point on the earth, or from some other reference point. For example, content may be locked except for use within a specified floor in a building. In modern city environments, many businesses could occupy a same two-dimensional (2D) geographic region, but be identified by a building floor that they occupy. Thus, subject invocations address this issue by including elevation in the region definitions such that content may then be locked/unlocked based on the content's physical relationship to the region.

In some embodiments the region is a region that is mobile or movable. That is, the region may be associated with or otherwise defined to move relative to a position on the earth. Examples of such mobile or movable regions include, but are not limited to regions associated with a car or bus (or other motor vehicle), a boat, a train, a plane, or the like. A region that is in motion then would represent a moving vehicle, moving boat, moving train, moving bus, or the like. The content may then be made accessible to a client device that is within the region that is in motion, and locked or otherwise inaccessible otherwise. It will be understood that in at least some embodiments, the mobile or movable region is not necessarily constantly in motion, but may be at rest during certain time periods (e.g., at a bus stop, train station, or airport.) The movable or mobile region can be defined one-dimension (e.g., a distance from a particular point like the vehicle, train, plane, or the like) or in two-dimensions (e.g., with a two-dimensional boundary) or in three-dimensions (e.g., with a three-dimensional boundary).

In some embodiments, the content can also be locked except for an interlocking chain of regions so that content is locked except along a defined route, such as might be traveled by a commercial vehicle like a bus, train, or the like. In other embodiments, the content can be secured within a region that moves. For example, the content might be useable when the content is detected within a bus, train, or other vehicle, even when that vehicle takes (is moving through) a different route. Further, the content may be locked based on elevation, as well as motion. Thus, for example, a user might purchase, or otherwise request, the content prior to boarding a plane. The content might remain locked until the plane exceeds a particular elevation during flight. Further, when the plane again descends below the particular elevation, or a differently defined elevation, the content may again be locked from access. In this way, airlines may provide content, while maintaining a level of safety.

Similarly, motion may be used to selectively lock and/or unlock content based further on the type of content. For example, when it is determined that the content includes video or other graphics, and the client device having the content is determined to be moving relative to some defined position, then the content may be locked from access. In this way, a user might be obliged to look away from their client device, say when they are walking around in a building. By locking the content in this manner, the user is less likely to be distracted. When the content is determined to be audio content absent graphics, then the content might be allowed to be unlocked.

However, in other situations, when the user is moving and it is determined that the defined position is also in motion, then the content may be unlocked. This situation might arise when the user is a passenger on a commercial vehicle. The content may be locked when the vehicle is stopped and unlocked when the vehicle is moving (and the content is within the region). In some embodiments, the content might be allowed to remain unlocked when both the vehicle and the client device has stopped moving. In this manner, the user may continue to access the content even while the vehicle stops such as at stations, stop lights, or the like. When the user then leaves the vehicle, and therefore the region, the content automatically terminates or otherwise is locked against access. In this manner, a train company, airline, or other transportation provider, may provide content free, or at a reduced fee, to a passenger with expectations that the content would increase the likelihood that their passengers would come back.

FIG. 1-A shows components of one embodiment of an environment in which the invention may be practiced. Not all the components may be required to practice the invention, and variations in the arrangement and type of the components may be made without departing from the spirit or scope of the invention. As shown, system 100-1 of FIG. 1-A includes network 107, client devices 102-105, and Access Device 110. In one embodiment, Access Device 110 may also be a defined position for reference. Also shown is region 120.

Region 120 may be any region that is defined in two-dimensional or three-dimensional space. As such, region 120 may be uniquely defined, for example, to describe a floor layout of a building, dimensions of vehicle, or any of a variety of other regions. For example, a region 120 might be defined around a landmark, a street corner, a park, a store, or the like. Region 120 may be defined using any of a variety of coordinate systems, including, for example, latitude, longitudes, and attitudes. However, region 120 may also be defined based on a radial distance from a defined position. In some embodiments, region 120 may reflect a physical constraint, such as might arise from a building. However, region 120 need not be so constrained, and may instead be an artificial perimeter about any point or points taken in space.

Region 120 may be defined in a file, document, spreadsheet, or other mechanism that is stored within a computing device, such as access device 110. However, the definition of region 120 may also be stored, or otherwise accessible from any of a variety of other sources. In some embodiments, a definition of the region and/or other regions of constraint, as well as motion constraints, as appropriate, may be provided along with the protected content, and component, to a client device.

One embodiment of client devices 102-105 is described in more detail below in conjunction with FIG. 2. In one embodiment, at least some of client devices 102-105 may operate over a wired and/or a wireless network such as network 107. As shown, client devices 102-105 may include virtually any computing device capable of communicating over a network to send and receive information, including instant messages, performing various online activities, or the like. The set of such devices may include devices that typically connect using a wired or wireless communications medium such as personal computers, multiprocessor systems, microprocessor-based or programmable consumer electronics, network PCs, or the like. Also, client devices 102-105 may include virtually any device usable as a video display device, such as a television, display monitor, display screen, projected screen, and the like. Additionally, client device 106 may include any kind of consumer electronic device, e.g., a Blu-ray player, DVD player, CD player, portable music playing device, portable display projector, and the like. Moreover, client devices 102-105 may provide access to various computing applications, including a browser, or other web-based application.

Generally, however, client devices 102-105 may include virtually any portable computing device capable of receiving and sending messages over a network, accessing and/or playing content, such as network 107, or the like. Further, client devices 102-105 may include virtually any portable computing device capable of connecting to another computing device and receiving information such as, laptop computer, smart phone, and tablet computers, and the like. However, portable computer devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 102-105 typically range widely in terms of capabilities and features.

A web-enabled client device may include a browser application that is configured to receive and to send web pages, web-based messages, and the like. The browser application may be configured to receive and display graphics, text, multimedia, media content, and the like, employing virtually any Internet based and/or network-based protocol, including but not limited to a wireless application protocol messages ("WAP"), Hypertext Transfer Protocol ("HTTP"), or the like. In one embodiment, the browser application is enabled to employ Handheld Device Markup Language ("HDML"), Wireless Markup Language ("WML"), WMLScript, JavaScript, or other scripting language, Standard Generalized Markup Language ("SGML"), HyperText Markup Language ("HTML"), eXtensible Markup Language ("XML"), and the like, to display and send a message. In one embodiment, a user of a client device may employ the browser application to perform various activities over a network (online) However, another application may also be used to perform various online activities.

As described further below, the browser application may enable a user to access content, over a network (e.g., network 107), such as might be provided through Access Device 110. In some embodiments, Access Device 110 may include within a webpage accessed by client device 102-105, one or more scripts, links, and/or other instructions that enable the client device to download for installation one or more components, definitions of regions, and/or other access constraints, along with the protected content from Access Device 110.

Client devices 102-105 also may include at least one other client application that is configured to receive and/or send content between another computing device. The client application may include a capability to send and/or receive content, or the like. The client application may further provide information that identifies itself, including a type, capability, name, and the like. In one embodiment, client devices 102-105 can identify themselves as part of a class of devices. In another embodiment, client devices 102-105 can uniquely identify themselves through any of a variety of mechanisms, including a phone number, Mobile Identification Number ("MIN"), an electronic serial number ("ESN"), Internet Protocol (IP) Address, network address, or other mobile device identifier. The information may also indicate a content format that the mobile device is enabled to employ. Such information may be provided in a network packet, or the like, sent between other client devices, Access Device 110, or other computing devices. Moreover, it should be readily understood that devices and/or components within a device that is communicating with a client device may also identify themselves using any of a variety of mechanisms, including those used by the client device.

In at least some embodiments, the client devices of FIG. 1-A, or content on the client devices, can be labeled as "locked," "unlocked," or "selectively locked" to illustrate various instances of the protected content with respect to region 120. Client device 102 is shown to be within region 120, and therefore, the content is unlocked and accessible. Both client devices 104-105 are outside of region 120, and therefore their respective protected content is locked. Client device 103 is illustrated as being in motion relative to Access Device 110's defined position. As discussed elsewhere, based on being within region 120, and further based on the type of content being protected, the content may be selectively locked or unlocked.

Network 107 is configured to couple client devices 102-105 and their components with Access Device 110. Network 107 may include any of a variety of wireless sub-networks that may further overlay stand-alone ad-hoc networks, and the like, to provide an infrastructure-oriented connection for client devices 102-105. Such sub-networks may include mesh networks, Wireless LAN ("WLAN") networks, cellular networks, and the like. In one embodiment, the system may include more than one wireless network.

Network 107 may further include an autonomous system of terminals, gateways, routers, and the like connected by wireless radio links, and the like. These connectors may be configured to move freely and randomly and organize themselves arbitrarily, such that the topology of network 107 may change rapidly.

Network 107 may further employ a plurality of access technologies including 2nd (2G), 3rd (3G), 4th (4G), or future generation radio access for cellular systems, WLAN, Wireless Router ("WR") mesh, and the like. Access technologies such as 2G, 3G, 4G and future access networks may enable wide area coverage for mobile devices, such as client devices 102-105 with various degrees of mobility. In one non-limiting example, network 107 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, network 107 may include virtually any wireless communication mechanism by which information may travel between client devices 102-105 and another computing device, network, and the like.

Also, network 107 can include the Internet in addition to LANs, WANs, direct connections, such as through a universal serial bus ("USB") port, other forms of network mechanism, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 107 may be configured to transport information using an Internet Protocol ("IP"). In essence, network 107 includes any communication method by which information may travel between computing devices.

Additionally, network mechanisms by way of example, network mechanisms include wired media such as twisted pair, coaxial cable, fiber optics, wave guides, and other wired media and wireless media such as acoustic, RF, infrared, and other wireless media.

One embodiment of Access Device 110 is described in more detail below in conjunction with FIG. 3. Briefly, however, Access Device 110 includes virtually any network device usable to operate as a content server to connect to network 107 to provide content to client devices 102-105, and to further manage access to the content based in part on a region with possible motion. In some embodiments, Access Device 110 may provide protected content to a client device. The protected content may be provided along with a component such as an application, script, or the like. In some embodiments, a definition of one or more regions, along with any other access constraints, are also downloaded to the client device. In some embodiments, not only is the content encrypted, but the definitions of the regions and other access constraints may also be encrypted. The component can be configured to further manage access to the content when the client device is outside of a defined region, such as region 120.

In some embodiments, the component might include a capability to perform decryption on the content by receiving a decryption key from Access Device 110. In some embodiments, the decryption key is encrypted using a public key associated with the component. The private key associated with the public key can be, in some embodiments, embedded within the component, such that the private is inaccessible other than through use of the component. In some embodiments, the component might include a tamper detection agent that monitors for improper attempts access the keys or the content. When such attempts are detected, the component might then perform any of a variety of security actions, including, destroying the keys, destroying the content, or any of a variety of other actions.

In some embodiments, the component provided with the content may perform actions as described further below in conjunction with FIG. 4 to manage access to the content. In some embodiments, the content may be made accessible for use with another application, such as a browser, media player or the like, resident within the client device.

It should be readily recognized that Access Device 110 is configured to operate on behalf of a content owner, distributor, or similar business entity. However, while used herein to represent such network devices useable to provide content, it is further recognized that other devices may also be employed. For example, a content provider may employ one network device to provide content, and a different network device for use in managing access to that content based at least on a region. Thus, other configurations and variations of devices serving content are also envisaged, and other embodiments are not constrained to a single configuration/arrangement of devices. Moreover, Access Device 110 may contain a plurality of network devices to provide content, licenses, and/or decryption keys to a client device, such as client devices 102-105. Similarly, in another embodiment, Access Device 110 may contain a plurality of network devices that operate using a master/slave approach, where one of the plurality of network devices of Access Device 110 operates to manage and/or otherwise coordinate operations of the other network devices. In other embodiments, the Access Device 110 may operate as a plurality of network devices within a cluster architecture, a peer-to-peer architecture, and/or even within a cloud architecture. Thus, the invention is not to be construed as being limited to a single environment, and other configurations, and architectures are also envisaged.

As shown in FIG. 1-A, Access Device 110 is illustrated to be within region 120. However, other embodiments are not so limited. For example, Access Device 110 might reside outside of region 120, while another defined position remains within region 120. In this manner, Access Device 110 might be configured to provide access management over a plurality of different regions.

Devices that may operate as Access Device 110 include various network devices, including, but not limited to personal computers, desktop computers, multiprocessor systems, microprocessor-based or programmable consumer electronics, network PCs, server devices, network appliances, and the like.

FIG. 1-B shows components of another embodiment of an environment in which the invention may be practiced. Not all the components may be required to practice the invention, and variations in the arrangement and type of the components may be made without departing from the spirit or scope of the invention. As shown, system 100-2 of FIG. 1-B includes network 107-2, client device 102, and Access Device 110. In one embodiment, Access Device 110 may also be a defined position for reference. However, as illustrated, a defined position 190 may be established that is other than Access Device 110. Also shown is region 160, which may represent an internal perimeter of an aircraft, or other structure. As illustrated, region 160 is above a reference point 199 by some elevation, and is shown to be in motion.

Client device 102, Access Device 110, and network 107-2 are similar to those components described above in conjunction with FIG. 1-A. Further, as illustrated in FIG. 1-B, the protected content on client device 102 is unlocked. As discussed herein, this state of the content may be based on the content being within the defined region 160 including being above a defined elevation.

FIG. 2 shows one embodiment of client device 200 that may be included in a system implementing the invention. Client device 200 may represent any of a variety of platforms useable to perform actions as disclosed within. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1-A.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, and a global positioning systems ("GPS") receiver 232.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, code division multiple access ("CDMA"), time division multiple access ("TDMA"), user datagram protocol ("UDP"), transmission control protocol/Internet protocol ("TCP/IP"), Short Message Service ("SMS"), GPRS, WAP, ultra wide band ("UWB"), Institute of Electrical and Electronics Engineers ("IEEE") 802.16 Worldwide Interoperability for Microwave Access ("WiMax"), session initiated protocol/real-time transport protocol ("SIP/RTP"), or any of a variety of other wired and/or wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be an LCD, gas plasma, light emitting diode ("LED"), or any other type of display used with a computing device. Display 240 may also include a touch sensitive screen arranged to receive input from an object such as a stylus or a digit from a human hand.

Moreover, display 240 may be configured to employ any of a variety of network connection types, including, but not limited to High-Bandwidth Digital Content Protection (HDCP) connection types, Display Port (DP), Digital Visual Interface (DVI), and High-Definition Multimedia Interface (HDMI), as well as Gigabit Video Interface (GVIF), Standard-definition (SD), Unified Display Interface (UDI), or Intel Wireless Display (WiDi). At least some of these network connection types provide a form of digital copy protection. A detection of whether display 240 is connected through one of these, or other types, of network connection types may be determined using a variety of techniques, including signature transmissions, protocol handshakes, authentication procedures, or the like.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address. In some embodiments, information from GPS transceiver 232 may be used to indicate whether client device 200 is moving. This may be achieved, for example, based on determining a change of locations over time. However, other sensors within client device 200 might also be useable to indicate whether client device 200 is moving, including, accelerometers, gyroscopes, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs. However, the operating system may also provide interfaces to any of a variety of other scripting language programs as well, and are therefore not constrained to Java.

Mass memory 226 further includes one or more data storage 208, which can be utilized by client device 200 to store, among other things, applications 214, protected content, and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store information including address books, buddy lists, aliases, user profile information, or the like. Further, data storage 208 may also store messages, web page content, downloaded components, protected content, or any of a variety of other content. At least a portion of the information may also be stored on another component of client device 200, including, but not limited to a disk drive, non-transitory processor-readable storage device 230 within client device 200, or even on a physical storage device accessible by client device 200 through network interfaces 236, or the like.

Applications 214 may include computer executable instructions which, when executed by client device 200, transmit, receive, and/or otherwise process messages (e.g., SMS, Multimedia Message Service ("MMS"), instant messages ("IM"), email, and/or other messages), audio, video, and enable telecommunication with another user of another client device. Other examples of application programs include calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218, media player 261, and Region Detection Application (RDA) 272.

Browser 218 may include virtually any application configured to receive and display graphics, text, multimedia, and the like, employing virtually any web based protocol. In one embodiment, the browser application is enabled to employ HDML, WML, WMLScript, JavaScript, other scripting languages, SGML, HTML, XML, and the like, to display and send a message. However, any of a variety of other web-based programming languages may be employed. In one embodiment, browser 218 may enable a user of client device 200 to provide and/or receive content from another computing device, such as Access Device 110 of FIG. 1-A. Although browser 218 is described herein, it should be noted that there are a plurality of other applications that may operate as a user agent configured to request and/or access content over a network. Thus, other user agents may also be included within client device 200. Moreover, while a single browser is illustrated, it should be noted that client device 200 may include a plurality of browsers or applications providing functionality of a browser application.

As an aside, while client device 200 may receive content over a network such as network 107 of FIG. 1-A, content may be obtained through other mechanisms as well, including via a portable storage device, such as a DVD, USB storage device, CD, or the like.

Media player 261 represents any of a variety of software and/or hardware configurations arranged to receive and play various content. As such, in one embodiment, media player 261 may also represent a hardware component that might be installed within client device 200 and/or coupled electrically to client device 200 to enable client device 200 to access and play content. In one embodiment, media player 261 may receive protected content from browser 218, and employ RDA 272 to enable access and/or play of the received protected content.

While browser 218 and media player 261 are illustrated, it should be understood that client device 200 may include a plurality of other applications usable to enable client device to play or otherwise access unlocked content.

RDA 272 represents a component that may be installed within client device 200 to manage selective access to content that is protected at least based on a relationship to a defined region, and/or a motion of the client device. RDA 272 may be configured to access one or more encryption/decryption keys usable to unlock protected content 273. In one embodiment, the decryption keys may be provided to RDA 272 from another device. In some embodiments, the decryption keys may be configured to expire after a defined period of time. In this manner, a new decryption key will be needed to continue to provide access to protected content 273. In other embodiments, the new decryption key might be sent to client device 200 by another device based on a determination that the client device 200 is within a defined region for protected content 273, and optionally further satisfies a motion criteria.

In some embodiments, RDA 272 may include a private key associated with a public key. The decryption keys sent to client device 200 may then be encrypted using the public key. In this manner, access may be further controlled by RDA 272. RDA 272 may employ a process such as described below in conjunction with FIGS. 4-5 to perform at least some of its actions.

Figure 3:
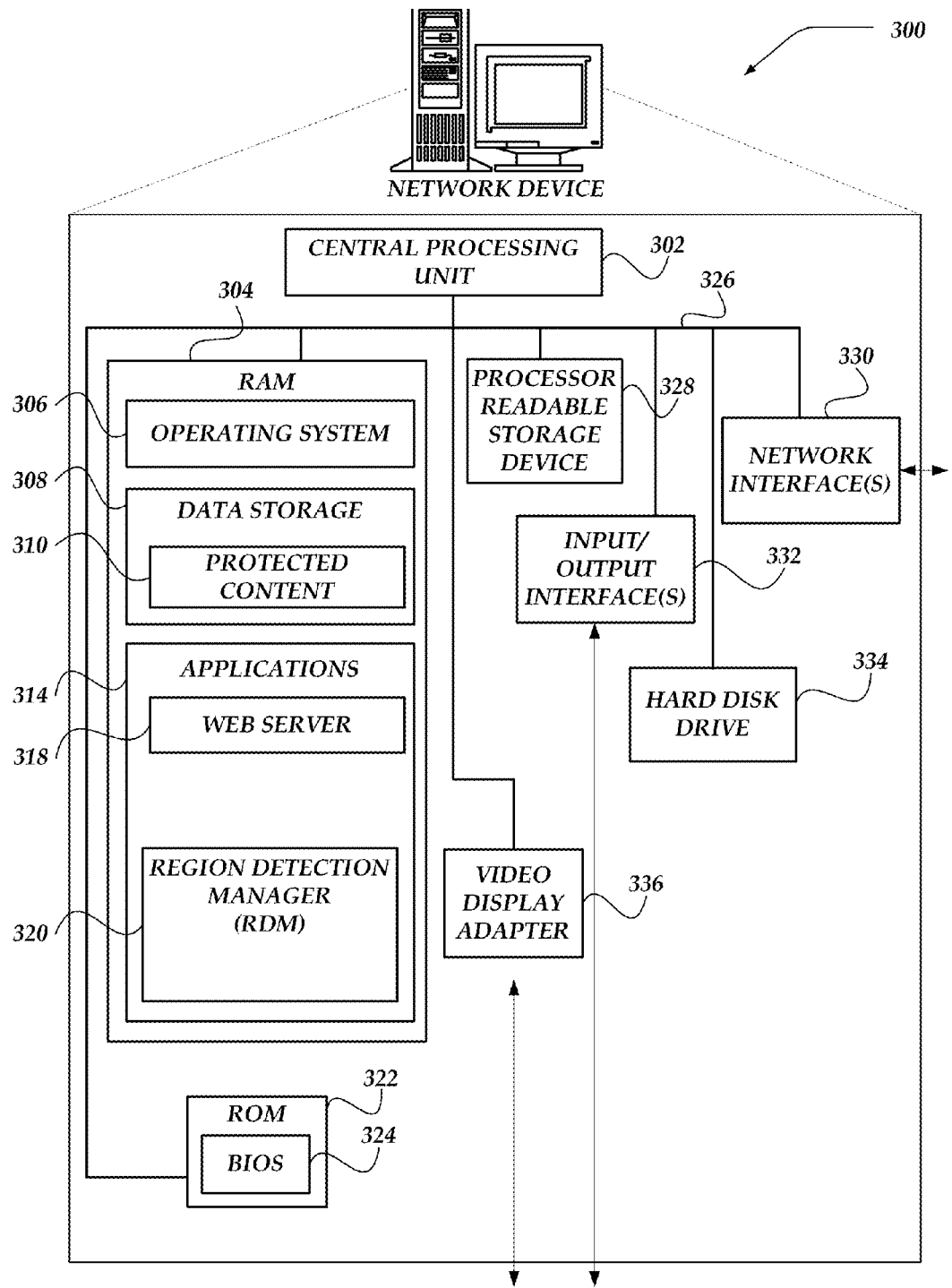
FIG. 3 illustrates one possible embodiment of a network device usable by a content provider within the environment of FIGS. 1A and 1B.

FIG. 3 shows one embodiment of a network device 300, according to at least one embodiment of the invention. Network device 300 may include many more or less components than those shown. The components shown, however, are sufficient to disclose an illustrative embodiment for practicing the subject innovations. Network device 300 may be configured to operate as a server, a client, a peer, a host, or any other device. Network device 300 may represent, for example Access Device 110 of FIG. 1-A.

Network device 300 includes central processing unit 302, computer readable storage device 328, network interface unit 330, an input/output interface 332, hard disk drive 334, video display adapter 336, and a mass memory, all in communication with each other via bus 326. The mass memory generally includes RAM 304, ROM 322 and one or more permanent (non-transitory) mass storage devices, such as hard disk drive 334, tape drive, optical drive, and/or floppy disk drive. The mass memory stores operating system 306 for controlling the operation of network device 300. Any general-purpose operating system may be employed. BIOS 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical media which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to non-transitory (processor) computer readable storage device 328, hard disk drive 334, or the like.

Data storage 308 may further store protected content 310. Protected content 310 represents any of a variety of content that may be protected from access using based on a relationship to a defined region or regions, and optionally based on motion criteria. Although not shown, data storage 308 may also include storage for encryption/decryption keys, downloadable components usable by client devices to manage access, as well as definitions of regions, and/or other access criteria.

The mass memory also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 318 and Region Detection Manager 320 may also be included as application programs within applications 314.

Web server 318 represent any of a variety of services that are configured to provide content, including messages, over a network to another computing device. Thus, web server 318 includes, for example, a web server, an FTP server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like. Web Server 318 may also be configured to enable a user of a client device, such as client devices 102-105 of FIG. 1, to browse content, such as protected content 310, and select content for access on the client device. Further, web server 318 may be configured to provide for installation and/or execution at a client device, a downloadable component, such as discussed above.

Region Detection Manager (RDM) 320 represents one or more applications that are configured to manage access to protected content on a client device based in part on a region or regions, and possibly based further on a motion of the content in relationship to some defined position. RDM 320 may operate in conjunction with a downloaded component on the client device, or independent of a downloaded component. In some embodiments, RDM 320 may receive information indicating a location of a client device, and in conjunction with one or more defined regions, determine whether the client device having protected content is within a defined region to enable access. When the client device is within the defined region, and other criteria, such as motion criteria, so allows, then RDM 320 may provide decryption keys or other information to the client device usable to enable the client device to unlock and access the content. Thus, in some embodiments, determination and directions to unlock content may be performed by RDM 320. However, as noted above, in other embodiments, such determinations may be performed by the downloaded component and not by RDM 320. Thus, various configurations may be used to provide increased flexibility in managing access to the protected content. In any event, in some embodiments, RDM 320 employs a process such as described below in conjunction with FIGS. 4-5 to perform at least some of its actions.

The operation of certain aspects of various embodiments will now be described with respect to FIGS. 4-5. FIG. 4 illustrates a flow chart of one embodiment of a process usable to manage selective access to content that is protected based on a relationship of the content to a mobile region.

Figure 4:
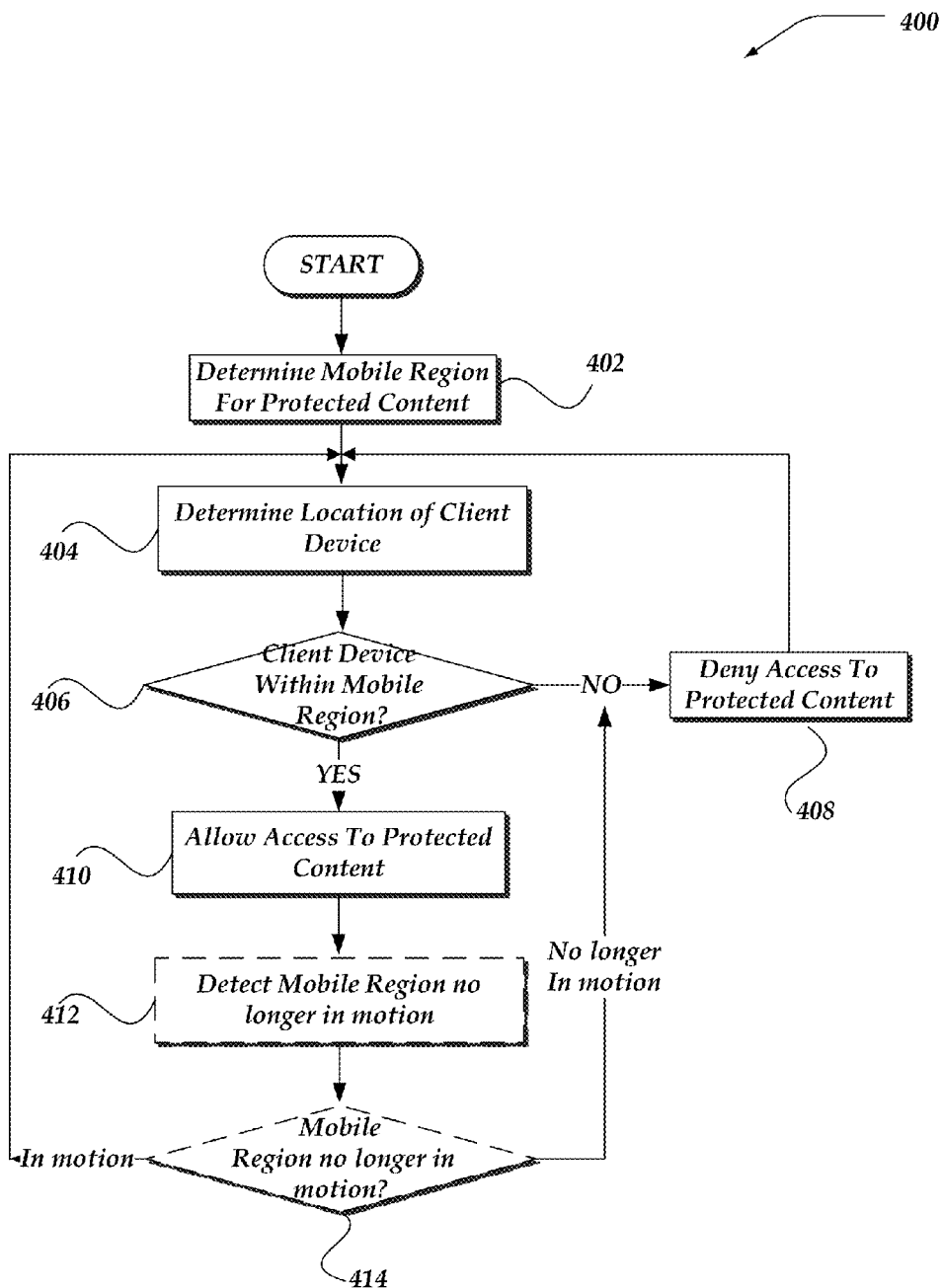
FIG. 4 illustrates a flow chart of one embodiment of a process usable to manage selective access to content that is protected based on a relationship of the content to a mobile region.

Process 400 of FIG. 4 may be performed within a client device, such as the client devices of FIGS. 1-A and 1-B. However, in other embodiments, process 400 can also be performed by a network device, such as Access Device 110 of FIGS. 1-A and 1-B. In still other embodiments, at least some of the steps shown in process 400 may be performed in a client device, while other steps might be performed within a network device, such as Access Device 110 of FIGS. 1-A and 1-B.

In any event, prior to or during process 400, a client device receives protected content. The client device may receive the protected content using any of a variety of mechanisms, including over a network, through a portable non-transitory storage device, or the like. In some embodiments, the protected content may be purchased and thereby licensed for use outside of a region. However, in other embodiments the protected content may include a license that further restricts the access of the content to being within a defined region or regions.

In any event, process 400 begins, after a start block, at block 402, where a mobile region is determined for the protected content. A mobile region includes any region that is mobile or otherwise movable. Such regions, as discussed above, include regions that might be associated with a moving vehicle, such as a train, bus, car, motorcycle, plane, boat, or the like. In some embodiments, the region is defined as a region that is in motion. Non-exhaustive examples of a region that is in motion might include a plane in flight, a boat that is in motion, a car, train, or bus that is traveling a route, or the like. The mobile region might include, for example, an interior region of such mobile or movable vehicles. However, other regions may be defined. In some embodiments, a position within or associated with the vehicle might be used to define a distance from the position that is then used to define the mobile region. For example, consider a position on a bus, such as a dashboard location, overhead position on the roof of the bus, or the like. Then the region might be defined as being within a definable distance from that position. In some embodiments, the distance from that position might asymmetric, such that distances above the position might be excluded, while distances measured below the position would be included. Other definitions are also useable. Thus, these examples are not to be construed as limiting the embodiments. Moreover, in some embodiments, the mobile region is a region that is in motion.

Process 400 then flows to block 404, where a location of the client device is determined, such that it is then determined whether the client device is within the mobile region. Any of a variety of mechanisms may be used to make such a determination, including use of GPS systems, IR systems, network signal strengths, or the like.

Moving to decision block 406, a determination is made whether the client device is within the mobile region. For example, a determination can be made whether the client device is within the region that is in motion. In some embodiments, such determination further includes a determination whether the region (and the client device) is in motion or above a defined altitude or the like. If it is determined that the client device is within the region, then processing flows to block 410; otherwise processing flows to block 408.

At block 408, when it is determined that the client device is outside of the region and/or other definable region criteria (e.g., whether the region is in motion or the altitude of the region or the like), then access to the protected content by the client device is denied. Processing then flows back to block 404 to continue processing. In some embodiments, processing can flow back to block 402 to enable the region to be dynamically determined/re-determined.

At block 410, when it is determined that the client device is within the region and/or other definable region criteria (e.g., whether the region is in motion or the altitude of the region or the like), then access to the protected content is selectively allowed. In some embodiments, the access might still be denied based on other criteria. For example, should it be determined that an improper attempt to access the protected content is detected, such as hacking, tampering, or the like, then, access might continue to be denied. In some embodiments, such detection might include destroying of the protected content, such that further attempts to improperly access the content would be futile.

When access is allowed, this might include providing a decryption key access to a module that enable decryption of the protected content. The decryption key, in some embodiments might be encrypted based on a public/private cryptographic key pair, where the decryption key is encrypted with the public key. Access to the private key might be restricted to the module protecting the content, such as RDA 272, discussed above in conjunction with FIG. 2.

Process 400 may then optionally flow to block 412. In some embodiments, block 412 might be excluded, such that processing instead flows back to block 404 (or 402). In any event, when block 412 is included, then an analysis is performed to determine whether the mobile region is no longer in motion. Such evaluation might be performed when the region is a region that is in motion. Moving to decision block 414, when it is determined that the region is no longer in motion, then processing flows to block 408, where access to the protected content is denied. Otherwise, processing loops back to block 404 (or 402).

It should be noted that process 400 may be terminated at any time, based on detecting an improper attempt to access the content, a purchase of a license that allows access to the content independent of the region, or other region related criteria.

Figure 5:
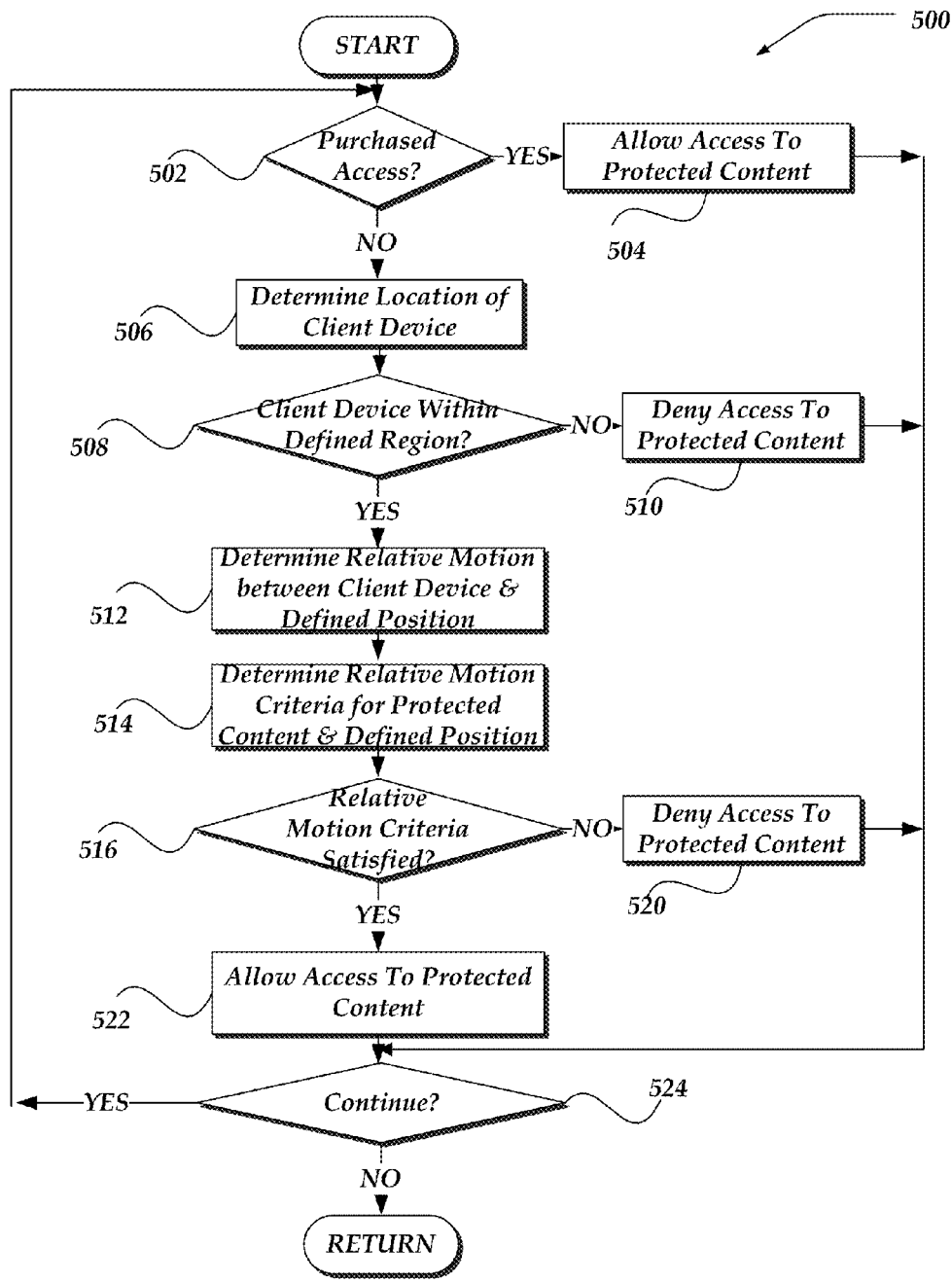
FIG. 5 illustrates a flow chart of one embodiment of a process usable to manage selective access to content that is protected based on a relationship of the content to a region and further based on a motion of the content relative to the region.

FIG. 5 illustrates a flow chart of one embodiment of a process usable to manage selective access to content that is protected based on a relationship of the content to a region and further based on a motion of the content relative to the region.

Process 500 of FIG. 5 may be performed within a client device, such as the client devices of FIGS. 1-A and 1-B. However, in other embodiments, process 500 can also be performed by a network device, such as Access Device 110 of FIGS. 1-A and 1-B. In still other embodiments, at least some of the steps shown in process 500 may be performed in a client device, while other steps might be performed within a network device, such as Access Device 110 of FIGS. 1-A and 1-B.

In any event, prior to process 500 a client device receives protected content. In some embodiments, the protected content is provided when the client device is detected to be within a defined region. However, other region definitions also are applicable. As discussed above, the protected content may provided with another component that manages access to the protected content.

In some embodiments, the protected content can be received by the client device while outside of the defined region. As discussed above, the protected content is locked such that access to the protected content is denied at least until the client device with the protected content is determined to be within the region. Thus, for example, a user might acquire the protected content from one location, but be unable to actually access the content until within the region. However, in some embodiments, a user can purchase, or otherwise acquire, access to the protected content that is unconstrained by a region.

Thus, process 500 begins at optional decision block 502, where a determination is made whether unrestricted access to the protected content has been purchased, or otherwise acquired. For example, by completing a form, paying for a license, or taking other appropriate actions, a user might acquire a license for use of the protected content uninhibited by a region. If it is determined that unrestricted access has been appropriately acquired, processing flows to block 504; otherwise processing flows to block 506. Decision block 502 may not be applicable in instances where unrestricted access to the content is not available, in which case process 500 can begin at block 506.

At block 504, a license, or other mechanism is used to enable the protected content to be unlocked, such that access to the protected content is provided to the user uninhibited by a region. Processing then flows to decision block 524.

At block 506, a location of the client device is determined. In some embodiments, the location is determined by the client device using any of a variety of techniques. In other embodiments, the location of the client device is determined by another network device other than the client device.

Continuing to decision block 508, a determination is then made whether the client device's location is within a defined region for the protected content. If so, then processing flows to block 512; otherwise, processing flows to block 510. Alternatively, in some instances only a two-dimensional location is determined, particularly in those instances access to content is determined solely on the two-dimensional location without reference to a third dimension (e.g., elevation).

At block 510, access to the protected content is denied. In some embodiments, a message can be displayed to the user indicating that access is denied. Processing then flows to decision block 524.

At block 512, a determination is made of a relative motion between the client device and a defined position. The defined position can be within the region, or external to the region. For example, in some embodiments, the defined position might be a same position as Access Device 110. Determining relative motion allows for increased flexibility in managing access to the protected content. For example, it might be determined that when a user is walking and reading the protected content, there is an increased likelihood that the user might bump into something or someone. Therefore, for safety reasons, when it is determined that the user is moving relative to a defined position, then it might make sense to disable access to the protected content. However, in other situations, where both the user and the defined position are in motion, access might be allowable. For example, consider where the user is on a train, bus, in a cab, airplane, or other moving vehicle. In such situations, and assuming that the user is not driving the vehicle, then access would be allowable. In still other situations, it might be determined that the protected content does not include visual content. For example, the protected content might be a music file, or the like. In such situations, it might be determined that relative motion is acceptable, and therefore access to the protected content is acceptable. Thus, because the protected content, and the defined position, may have differing motion criteria, a determination is made at block 514 of what the relative motion criteria is for the protected content given the defined position, and/or region.

Flowing next to decision block 516, a determination is made whether the relative motion criteria is satisfied. If so, processing then flows to block 522; otherwise, processing flows to block 520. At block 520, access is denied to the protected content. Processing continues to decision block 524. At block 522, access is allowed to the protected content, based on the criteria. Processing then flows to decision block 524.

At decision block 524, a determination is made whether to continue to monitor access to the protected content. If monitoring is to continue, then processing branches back to decision block 502; otherwise, processing returns.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system, a cloud system, a multi-server system, or the like. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

As discussed above, the subject innovations are directed towards allowing high quality content suppliers like magazines, and book shops to license their content to geographic locations of a business. Any customer within range of the location of the business could then be allowed to make free use of the content.

Many shops, cafes, and coffee houses, for example, value returning business. They often want the customer to have a positive experience in the location and come back with repeat business. When the customer was in the middle of an interesting piece of content, when they left the location, they are likely to feel encouraged to go back or buy the content.

Other places like barbers, dentists, doctor's offices, and so forth, where waiting is part of the experience offer free magazines and newspapers to their customers. The convention is that the newspaper or magazine is left behind for the next customer. The content supplied then might be consumed during the waiting of the service, and made inaccessible otherwise. Using the subject innovations disclosed herein, locations that might include waiting could offer high quality digital content for free and for use during waiting periods, within a waiting region.

Similarly, books, music, and software stores could offer full access to their goods whilst the customer was in the shop or even in a shopping mall. The user would be able to pick up an e-book for sale in the book shop and read it in the café next door. When they left the shopping mall the content would lock again, unless of course they decided to buy it. If the user came back to the shopping mall, they could carry on reading the book.

Electronic exam papers could also be restricted to access and opened when the papers are within a physical exam hall, and locked otherwise—until ready for grading in a particular location. Training material could only be accessed at the training course site. Voting ballots can be locked against voting stations.

Content licensed to libraries and schools may also be restricted based on a geographic region. This would allow the licensors of the content to lower the cost of the content to the library or school. If the content user wanted to take the content home with them they would then buy an extended license.

Again, in each of these examples, motion of the content in relationship to some defined position may be used to further restrict access of the content. In this way, a user of the content might be obliged to look up while walking, and possibly avoid an accident.

Content usage is not constrained to these examples. For example, a welcome pack might be sent to a user before a visit that has high quality digital content (e.g., audio and video presentations). The content may be downloaded onto the user's client device but can't be played. However, when the user arrives at an attraction, the content becomes unlocked and can be enjoyed. In some embodiments, the user might be allowed to continue to use the content while walking around. However, in other situations, the content might lock while the user moves from one attraction to another, in which case, the content becomes unlocked again.

When the user leaves the attraction(s), the content is locked. If the user wanted to take the content home, they may be allowed to buy an additional license.

Moreover, in other examples, the content might be an application, such as a game. For example, a series of content might be downloaded that is locked against locations. The location for the first piece of content is released. When the player gets to the location the content is unlocked and gives a clue to a next location. At the next location, the content is unlocked and so on.

In still another example, a user might be allowed to work on content while inside the office. However, such content might be protected such that when the user attempts to take it out of the company's location, such as outside, the content instantly locks. When the user again walks back into the building the content again instantly unlocks. Corporate policy could be used to lock files against the office location. Then any files that go outside need to be authorized and exported to a password protected file, or other mechanism appropriate to the corporate policy.

Forms may also be locked based on location. For example, once at a location, the form can be opened and filled in. Once the user leaves the location, the form locks. In this way, a company might ensure that data is entered at a given site, and not when the user goes back to the office. Again, the above are meant as examples, and other usages are envisaged. Thus, these examples do not restrict the subject innovations.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A client device, comprising:
    a receiving element to receive content over a network; and
    one or more processors that perform actions, including:
        receiving protected content;
        determining whether the client device is within a region that is in motion;
        when the client device is outside of the region that is in motion, denying access to the protected content by the client device;
        when the client device is within the region that is in motion, selectively allowing access to the protected content by the client device: and
        when the client device is within the region that is in motion, detecting whether the client device or the region that is in motion is above a defined altitude, and when below the defined attitude, denying access to the protected content.

2. The client device of claim 1, wherein the one or more processors perform actions, further including:
    detecting that the region is no longer in motion, and
    in response to such detection, denying access to the protected content.

3. The client device of claim 1, wherein the protected content includes a component that protects the content using a public/private cryptographic key pair.

4. The client device of claim 1, wherein the one or more processors that perform actions, including:
    receiving from a network device a decryption key that enables access to the protected content when the client device is within the region that is in motion.

5. The client device of claim 1, wherein determining that the client device is within the region that is in motion comprises determining that the client device is within the region based on a distance between the client device and a defined position within the region that is in motion.

6. The client device of claim 1, wherein the region that is in motion is defined as a three-dimensional region.

7. A computer-based method, wherein a plurality of actions are performed by a processor operating within a computing device, the actions comprising:
    receiving protected content at a client device:
    determining whether the client device is within a region that is in motion;
    when the client device is outside of the region that is in motion, denying the client device access to the protected content;
    when the client device is within the region that is in motion, selectively allowing the client device access to the protected content; and
    detecting that the client device or the region that is in motion is above a defined altitude, and when below the defined attitude, denying access to the protected content.

8. The computer-based method of claim 7, wherein the processor performs actions further comprising:
    detecting that the region is no longer in motion, and
    in response, denying access to the protected content.

9. The computer-based method of claim 7, wherein the region includes a network device usable to define region based on a distance from the network device.

10. The computer-based method of claim 7, wherein the protected content s protected from access using an encryption key.

11. The computer-based method of claim 7, wherein the processor performs actions further comprising:
    when an improper attempt to access the protected content is detected, destroying the protected content such that the protected content is no longer accessible.

12. The computer-based method of claim 7, wherein the actions further include:
    sending a license to the client device that enables extended access to the protected content outside of the region.

13. The computer-based method of claim 7, wherein the region is associated with a mobile vehicle, including a train, a boat, a motor vehicle, or an airplane.

14. An apparatus comprising a non-transitory computer readable medium, having computer-executable instructions stored thereon, that in response to execution by a client device, cause the client device to perform operations, comprising:
    receiving protected content onto the client device;
    determining whether the client device is within a region that is in motion;
    when the client device is outside of the region that is in motion, denying access to the protected content by the client device;
    when the client device is within the region that is in motion, selectively allowing access to the protected content by the client device: and
    detecting that the client device or the region that is in motion is above a defined altitude, and when below the defined attitude, denying access to the protected content.

15. The apparatus of claim 14, wherein the apparatus performs actions, further including:
   detecting that the region is no longer in motion, and
   in response, denying access to the protected content.

16. The apparatus of claim 14, wherein receiving the protected content further includes receiving the protected content over a network or from a portable storage device.

17. The apparatus of claim 14, wherein the region is defined based on either a distance between a position within the region and the client device, or based on a three-dimensional boundary.

* * * * *